United States Patent
Wei

(10) Patent No.: US 12,210,866 B2
(45) Date of Patent: Jan. 28, 2025

(54) HOTFIX METHOD AND APPARATUS

(71) Applicant: Beijing Bytedance Network Technology Co., Ltd., Beijing (CN)

(72) Inventor: Juncheng Wei, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 192 days.

(21) Appl. No.: 18/008,796

(22) PCT Filed: Dec. 1, 2021

(86) PCT No.: PCT/CN2021/134732
§ 371 (c)(1),
(2) Date: Dec. 7, 2022

(87) PCT Pub. No.: WO2022/156379
PCT Pub. Date: Jul. 28, 2022

(65) Prior Publication Data
US 2023/0229431 A1 Jul. 20, 2023

(30) Foreign Application Priority Data
Jan. 19, 2021 (CN) .................. 202110071098.X

(51) Int. Cl.
G06F 8/658 (2018.01)
G06F 8/41 (2018.01)

(52) U.S. Cl.
CPC .............. *G06F 8/658* (2018.02); *G06F 8/41* (2013.01)

(58) Field of Classification Search
CPC .................. G06F 8/658; G06F 8/41
See application file for complete search history.

(56) References Cited

U.S. PATENT DOCUMENTS 8,607,208 B1 * 12/2013 Arnold .................. G06F 8/656
717/153
10,114,637 B1 * 10/2018 Willson .................. G06F 8/71
(Continued)

FOREIGN PATENT DOCUMENTS

CN 103019787 A 4/2013
CN 107092517 A * 8/2017 .......... G06F 21/105
(Continued)

OTHER PUBLICATIONS

Newbury, "Automated Hotxes for Misuses of Crypto APIs", 2020, University of Alberta (Year: 2020).*
(Continued)

*Primary Examiner* — Wei Y Zhen
*Assistant Examiner* — Junchun Wu
(74) *Attorney, Agent, or Firm* — Astute IP Law Group

(57) ABSTRACT

A hotfix method and apparatus are provided. The method comprises: compiling each SDK to obtain a compiled file of each SDK, a project to be fixed comprising at least two SDKs having a dependency relationship, and the compiled file of each SDK comprising an instrumentation code of each method to be fixed; if target methods to be fixed exist in the plurality of SDKs, retaining the instrumentation codes of said target methods in one of the SDKs, and deleting the instrumentation codes of said target methods in other SDKs; generating a hotfix patch, the hotfix patch comprising a patch corresponding to the instrumentation code of each method to be fixed; and when an access end accesses the compiled file of the at least one SDK of the project to be fixed, sending the hotfix patch to the access end.

15 Claims, 4 Drawing Sheets

(56) References Cited

U.S. PATENT DOCUMENTS

| | | | |
|---|---|---|---|
| 10,621,068 B2* | 4/2020 | Kruszewski | G06F 8/41 |
| 2015/0286471 A1* | 10/2015 | Raz | G06F 8/41 |
| | | | 717/152 |
| 2017/0034023 A1* | 2/2017 | Nickolov | H04L 43/0817 |
| 2017/0147323 A1* | 5/2017 | Hu | G06F 8/658 |
| 2017/0199807 A1* | 7/2017 | Chang | G06F 8/65 |
| 2018/0268116 A1* | 9/2018 | Deaver | G06F 21/629 |
| 2019/0004793 A1* | 1/2019 | Brebner | G06F 8/38 |
| 2019/0369978 A1* | 12/2019 | Gandhi | G06F 8/65 |
| 2020/0183673 A1* | 6/2020 | Dehmann | G06F 8/65 |
| 2021/0182035 A1* | 6/2021 | Peng | G06F 8/41 |
| 2022/0291918 A1* | 9/2022 | Ren | G06F 8/64 |

FOREIGN PATENT DOCUMENTS

| | | | | |
|---|---|---|---|---|
| CN | 107179925 A | | 9/2017 | |
| CN | 109344619 A | | 2/2019 | |
| CN | 110531985 A | * | 12/2019 | |
| CN | 111078262 A | * | 4/2020 | G06F 21/57 |
| CN | 111290760 A | * | 6/2020 | G06F 8/41 |
| CN | 111752548 A | * | 10/2020 | |
| CN | 111831316 A | | 10/2020 | |
| CN | 112068903 A | | 12/2020 | |
| CN | 112667521 A | | 4/2021 | |

OTHER PUBLICATIONS

Macho et al., "Automatically Repairing Dependency-Related Build Breakage", 2018, IEEE (Year: 2018).*
Puder et al., "Exposing Native Device APIs to Web Apps", Jun. 2014, ACM (Year: 2014).*
Koyuncu et al., "FixMiner: Mining Relevant Fix Patterns for Automated Program Repair", Sep. 2019, arXiv (Year: 2019).*
International Search Report for International Patent Application No. PCT/CN2021/134732, mailed Feb. 23, 2022 (6 pages).

* cited by examiner

HOTFIX METHOD AND APPARATUS

This application is a 35 U.S.C. § 371 National Phase of International Patent Application No. PCT/CN2021/134732 titled "HOTFIX METHOD AND APPARATUS", filed on Dec. 1, 2021, which claims priority of Chinese Patent Application No.202110071098.X, titled "HOTFIX METHOD AND APPARATUS", filed with the China National Intellectual Property Administration on Jan. 19, 2021, both of which are incorporated herein by reference in their entireties.

FIELD

The present disclosure relates to the field of software maintenance technology, in particular to a hotfix method and apparatus.

BACKGROUND

Hotfix technology, also known as patch technology, can quickly repair online anomalies of software products with low-cost.

In some application scenarios, a software product needs to provide multiple components accessible to outside, and the accessible components have dependency on each other. Software development kits (SDKs) corresponding to these accessible components may be accessed by a same Android Application Package (APK). In such application scenarios, each of the SDKs should not be regarded as a completely independent SDK during hotfix, and the hotfix is required for all the SDKs. The SDK hotfix scheme in the conventional art is generally a hotfix scheme for a single SDK. Since the APK may access one or more SDKs, if the hotfix scheme for a single SDK is reused to hotfix each of the SDKs one by one, in the case that multiple SDKs are accessed by the same APK at the same time, it is very likely to cause conflicts between hotfix patches of the SDKs, thus leading to failure of the hotfix.

SUMMARY

In view of this, a hotfix method and apparatus are provided according to the present disclosure. Conflicts between hotfix patches of SDKs can be avoided when hotfix is performed on multiple accessible SDKs dependent from each other.

In order to achieve the above object, the following technical solutions are provided according to an embodiment of the present disclosure.

In a first aspect, a hotfix method is provided according to an embodiment of the present disclosure. The hotfix method includes:

compiling SDKs of a to-be-fixed project respectively to acquire a compiled file for each of the SDKs, where the to-be-fixed project includes at least two SDKs with dependency relationship, and the compiled file for each of the SDKs includes stubs for to-be-fixed methods in the SDK;

if a target to-be-fixed method exists in the two or more SDKs, retaining a stub for the target to-be-fixed method in the compiled file for one of the two or more SDKs and deleting the stub for the target to-be-fixed method from the compiled files for other SDKs;

generating a hotfix patch, where the hotfix patch includes a patch corresponding to a stub for each of the to-be-fixed methods; and sending the hotfix patch to an access terminal in a case that the access terminal accesses the compiled file for at least one SDK of the to-be-fixed project.

In a possible implementation of an embodiment of the present disclosure, the method further includes:

generating a mapping table corresponding to each of the SDKs in the process of compiling the SDKs of the to-be-fixed project respectively, where the mapping table corresponding to each of the SDKs records correspondence between the to-be-fixed methods and method identifiers of the corresponding SDK; and the determining, for each of the to-be-fixed methods, whether the to-be-fixed method exists in two or more SDKs of the to-be-fixed project includes:

determining whether a mapping relation table set contains a duplicate method identifier, wherein the mapping relation table set is a set of the mapping tables corresponding to the SDKs of the to-be-fixed project; and if a target method identifier is the duplicate method identifier, determining that the to-be-fixed method corresponding to the target method identifier exists in the two or more SDKs of the to-be-fixed project.

In a possible implementation of an embodiment of the present disclosure, the generating a mapping table corresponding to each of the SDKs in the process of compiling the SDKs of the to-be-fixed project respectively includes:

acquiring a method signature of each of the to-be-fixed methods in the SDKs in the process of compiling the SDKs of the to-be-fixed project respectively;

encrypting the method signature of each of the to-be-fixed methods in the SDKs based on a preset encryption algorithm, to acquire a corresponding encryption value of each of the to-be-fixed methods; and establishing correspondence between the to-be-fixed methods in the SDKs and the corresponding encryption values, to generate the mapping table for each of the SDKs.

In a possible implementation of an embodiment of the present disclosure, the encrypting the method signature of each of the to-be-fixed methods in the SDKs based on a preset encryption algorithm to acquire a corresponding encryption value of each of the to-be-fixed methods includes:

encrypting the method signature of each of the to-be-fixed methods in the SDKs based on a MD5 to acquire a MD5 value of the method signature.

In a possible implementation of an embodiment of the present disclosure, the method further includes:

adding, for each of the to-be-fixed methods, a method identifier of the to-be-fixed method to the stub for the to-be-fixed method in the process of generating the stub for the to-be-fixed method;

adding, for each of the to-be-fixed methods, the method identifier of the to-be-fixed method to the patch corresponding to the stub for the to-be-fixed method in the process of generating the hotfix patch;

determining whether a method identifier in each stub is the same as a method identifier in the called patch;

confirming that the hotfix patch is wrong in a case that the method identifier in one or more stubs is different from the method identifier in the called patch; and confirming that the hotfix patch is correct in a case that the method identifier in each stub is the same as the method identifier in the called patch.

In a possible implementation of an embodiment of the present disclosure, the generating a hotfix patch includes:

creating a target project, where the target project depends on the compiled file for each of the SDKs of the to-be-fixed project; and generating a patch for the target project, and using the patch for the target project as the hotfix patch.

In a possible embodiment of the embodiment of the present disclosure, the generating a patch for the target project includes:

acquiring a code set, where the code set includes codes of the compiled file corresponding to each of the SDKs of the to-be-fixed project;

reading to-be-fixed codes in the code set, where the to-be-fixed codes correspond to to-be-fixed methods in each of SDKs; and generating the patch for the target project based on the to-be-fixed codes.

In a second aspect, a hotfix apparatus is provided according to an embodiment of the present disclosure. The hotfix apparatus includes a compilation unit, a processing unit, a revision unit, a generation unit, and an issuing unit.

The compilation unit is configured to compile SDKs of a to-be-fixed project respectively to acquire a compiled file for each of the SDKs. The to-be-fixed project includes at least two SDKs with dependency relationship, and the compiled file for each of the SDKs includes stubs for to-be-fixed methods in the SDK.

The processing unit is configured to determine, for each of the to-be-fixed methods, whether the to-be-fixed method exists in two or more SDKs of the to-be-fixed project.

The revision unit is configured to, if a target to-be-fixed method exists in the two or more SDKs, retain a stub for the target to-be-fixed method in the compiled file for one of the two or more SDKs and delete the stub for the target to-be-fixed method from the compiled files for other SDKs.

The generation unit is configured to generate a hotfix patch. The hotfix patch includes a patch corresponding to a stub for each of the to-be-fixed methods.

The issuing unit is configured to send the hotfix patch to an access terminal in a case that the access terminal accesses the compiled file for at least one SDK of the to-be-fixed project.

In a possible implementation of an embodiment of the present disclosure, the compilation unit is further configured to generate a mapping table corresponding to each of the SDKs in the process of compiling the SDKs of the to-be-fixed project respectively. The mapping table corresponding to each of the SDKs records correspondence between the to-be-fixed methods and method identifiers of the corresponding SDK.

The processing unit is further configured to: determine whether a mapping relation table set contains a duplicate method identifier; and if a target method identifier is the duplicate method identifier, determine that the to-be-fixed method corresponding to the target method identifier exists in two or more SDKs of the to-be-fixed project.

The mapping relation table set is a set of the mapping tables corresponding to the SDKs of the to-be-fixed project.

In a possible implementation of an embodiment of the present disclosure, the compilation unit is further configured to acquire a method signature of each of the to-be-fixed methods in the SDKs in the process of compiling the SDKs of the to-be-fixed project respectively; encrypt the method signature of each of the to-be-fixed methods in the SDKs based on a preset encryption algorithm to acquire a corresponding encryption value of each of the to-be-fixed methods; and establish correspondence between the to-be-fixed methods in the SDKs and the corresponding encryption values, to generate the mapping table for each of the SDKs.

In a possible implementation of an embodiment of the present disclosure, the compilation unit is further configured to encrypt the method signature of each of the to-be-fixed methods in the SDKs based on a MD5 to acquire a MD5 value of the method signature.

In a possible implementation of an embodiment of the present disclosure, the apparatus further includes a verification unit.

The compilation unit is further configured to add, for each of the to-be-fixed methods, a method identifier of the to-be-fixed method to the stub for the to-be-fixed method in the process of generating the stub for the to-be-fixed method.

The generating unit is further configured to add, for each of the to-be-fixed methods, the method identifier of the to-be-fixed method to the patch corresponding to the stub for the to-be-fixed method in the process of generating the hotfix patch.

The verification unit is configured to: determine whether a method identifier in each stub is the same as a method identifier in the called patch; confirm that the hotfix patch is wrong in a case that the method identifier in one or more stubs is different from the method identifier in the called patch; and confirm that the hotfix patch is correct in a case that the method identifier in each stub is the same as the method identifier in the called patch.

In a possible implementation of an embodiment of the present disclosure, the generating unit is further configured to: create a target project, where the target project depends on the compiled file for each of the SDKs of the to-be-fixed project; and generate a patch for the target project, and take the patch for the target project as the hotfix patch.

In a possible implementation of an embodiment of the present disclosure, the generation unit is further configured to acquire a code set, read to-be-fixed codes in the code set, and generate a patch for the target project based on the to-be-fixed codes;

The code set includes codes of the compiled file corresponding to each of the SDKs of the to-be-fixed project. The to-be-fixed codes correspond to to-be-fixed methods in each of the SDKs.

In a third aspect, an electronic device is provided according to an embodiment of the present disclosure. The electronic device includes a memory and a processor. The memory is configured to store a computer program. The processor is configured to, when calling the computer program, perform the hotfix method according to the first aspect or any possible implementation of the first aspect.

In a fourth aspect, a computer readable storage medium storing a computer program is provided according to an embodiment of the present disclosure. The computer program, when executed by a processor, implements the hotfix method according to the first aspect or any possible implementation of the first aspect.

In a fifth aspect, a computer program product including a computer program carried on a computer readable medium is provided according to an embodiment of the present disclosure. The computer program, when executed by a processor, causes the processor to implement the hotfix method according to the first aspect or any possible implementation of the first aspect.

In the hotfix method according to an embodiment of the present disclosure, SDKs of a to-be-fixed project are compiled to acquire a compiled file for each of the SDKs, and it is determined, for each of the to-be-fixed methods, whether the to-be-fixed method exists in two or more SDKs. If a target to-be-fixed method exists in the two or more SDKs, a stub for the target to-be-fixed method is retained in the compiled file for one of the two or more SDKs and the stub for the target to-be-fixed method is deleted from the compiled files for other SDKs. Then a hotfix patch is generated, where the hotfix patch includes a patch corresponding to the stub for each of the to-be-fixed methods. Finally, the hotfix patch is sent to an access terminal when the access terminal accesses a compiled file for at least one SDK of the to-be-fixed project. It can be seen that in an embodiment of the present disclosure, it is determined, for each of the to-be-fixed methods, whether the to-be-fixed method exists in two or more SDKs. If a to-be-fixed method exists in two or more SDKs, a stub for the to-be-fixed method is only retained in a compiled file for one SDK, so as to remove duplicate to-be-fixed methods in the to-be-fixed project, and prevent the hotfix patch from fixing wrong to-be-fixed methods. Therefore, in an embodiment of the present disclosure, in the case that hotfix is performed on multiple accessible SDKs dependent from each other, conflicts between hotfix patches for the SDKs can be avoided.

BRIEF DESCRIPTION OF THE DRAWINGS

The accompanying drawings, which are incorporated herein and constitute a part of this specification, illustrate embodiments consistent with the present disclosure and, together with the specification, serve to explain the principles of the present disclosure.

In order to more clearly explain the embodiments of the present disclosure or the technical solutions in the conventional art, the drawings used in the description of the embodiments or the conventional art are briefly introduced below. Obviously, for those skilled in the art, other drawings can be obtained according to the provided drawings without any creative effort.

DETAILED DESCRIPTION

In order to make the purposes, features and advantages of the present disclosure more apparent and easy to understand, the technical solution of the present disclosure will be further described clearly and completely hereinafter. It should be noted that embodiments of the present disclosure and features in the embodiments may be combined with each other as long as there is no conflict.

In the following detailed description, numerous specific details are set forth in order to provide thorough understanding of the present disclosure. However, the present disclosure may also be implemented in other ways different from those described here. Apparently, the embodiments in the specification are only a part of the embodiments of the present disclosure, rather than all the embodiments.

In the embodiments of the present disclosure, wording "exemplary" or "for example" are used for examples, illustrations or description. Any embodiment or design described as "exemplary" or "for example" in the embodiments of the present disclosure shall not be interpreted as preferable or advantageous over other embodiments or designs. Specifically, the wording such as "exemplary" or "for example" is intended to present relevant concepts in a specific way. In addition, in the description of the embodiments of the present disclosure, unless otherwise specified, "multiple" means two or more.

Figure 1:
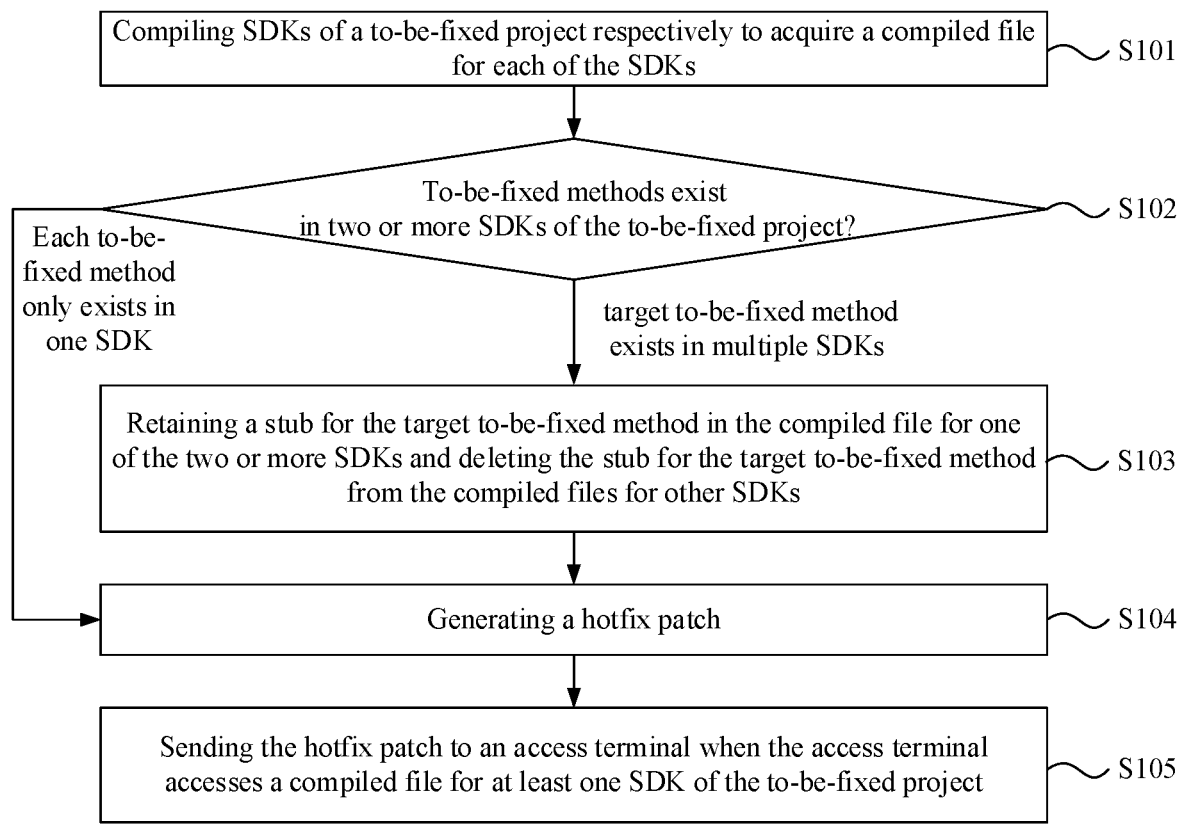
FIG. 1 is a first flow chart of a hotfix method according to an embodiment of the present disclosure.

A hotfix method is provided according to an embodiment of the present disclosure. Referring to FIG. 1, the hotfix method according to the embodiment of the present disclosure includes S101 to S105:

In S101, SDKs of a to-be-fixed project are compiled respectively to acquire a compiled file for each of the SDKs.

The to-be-fixed project includes at least two SDKs with dependency relationship, and the compiled file for each of the SDKs includes stubs for to-be-fixed methods in the corresponding SDK.

That is, in the process of compiling the SDKs in the to-be-fixed project, each of the SDKs in the to-be-fixed project is compiled as an independent SDK, and a compiled file for any SDK includes stubs for to-be-fixed methods in the SDK. For example, the compiled file for SDK1 includes stubs for to-be-fixed methods in SDK1.

As an example, a stub insert may be introduced into each SDK of the to-be-fixed project. Stub is generated for each to-be-fixed method in each class of a corresponding SDK by the introduced stub insert, thus completing the compilation of the SDKs and acquiring a compiled file for each of the SDKs. Specifically, the compiled file for each of the SDKs may include a mapping file of the corresponding SDK.

In S102, it is determined, for each of the to-be-fixed methods, whether the to-be-fixed method exists in two or more SDKs of the to-be-fixed project.

Specifically, a SDK will not include duplicate method and duplicate to-be-fixed method. However, different SDKs may include a same method and a same to-be-fixed method. When performing hotfix, a patch is generated for each of the to-be-fixed methods in the SDKs, and patches for the same to-be-fixed method in different SDKs may be different. If a target to-be-fixed method exists in SDK1 and SDK2, the patch for the target to-be-fixed method in SDK2 may be called for the target to-be-fixed method in SDK1, i.e., the patch is called by a wrong to-be-fixed method. Therefore, in an embodiment of the present disclosure, before generating a hotfix patch, it is firstly determined for each to-be-fixed method whether the to-be-fixed method exists in two or more SDKs of the to-be-fixed project. The above problems caused by the case that the to-be-fixed method exists in two or more SDKs are avoided through steps S102 to S105.

In S102, if each to-be-fixed method only exists in one SDK of the to-be-fixed project, the following S104 is performed. If a target to-be-fixed method exists in two or more SDKs of the to-be-fixed project, the following S103 is performed first, and then the following S104 is performed. The target to-be-fixed method may be any to-be-fixed method.

In S103, a stub for the target to-be-fixed method is retained in the compiled file for one of the two or more SDKs, and the stub for the target to-be-fixed method is deleted from the compiled files for other SDKs.

That is, if a to-be-fixed method exists in two or more SDKs of the to-be-fixed project, the stub for the to-be-fixed method is retained in the compiled file for one of the two or more SDKs, and the stub for the to-be-fixed method is deleted from the compiled files for other SDKs.

For example, if a to-be-fixed method 1 exists in a first SDK, a second SDK and a third SDK at the same time, the stub for the to-be-fixed method 1 may be retained in a compiled file for the first SDK, and the stub for the to-be-fixed method 1 is deleted from the compiled files for the second SDK and the third SDK.

It should be noted that the method for retaining the stub for the target to-be-fixed method in a compiled file for one SDK and deleting the stub for the target to-be-fixed method from compiled files for other SDKs may include: keeping a randomly selected compiled file for one SDK unchanged, and deleting the stub for the target to-be-fixed method from compiled files for other SKDs.

In S104, a hotfix patch is generated.

The hotfix patch includes a patch corresponding to a stub for each of the to-be-fixed methods.

Specifically, the hotfix patch may be generated for each method (to-be-fixed method with a stub) on which the hotfix is to be performed in the SDKs of the to-be-fixed project.

In S105, the hotfix patch is sent to an access terminal when the access terminal accesses a compiled file for at least one SDK of the to-be-fixed project.

In the hotfix method according to an embodiment of the present disclosure, SDKs of a to-be-fixed project are compiled to acquire a compiled file for each of the SDKs, and it is determined, for each of the to-be-fixed methods, whether the to-be-fixed method exists in two or more SDKs. If a target to-be-fixed method exists in the two or more SDKs, a stub for the target to-be-fixed method is retained in the compiled file for one of the two or more SDKs and the stub for the target to-be-fixed method is deleted from the compiled files for other SDKs. Then a hotfix patch is generated, where the hotfix patch includes a patch corresponding to the stub for each of the to-be-fixed methods. Finally, the hotfix patch is sent to an access terminal when the access terminal accesses a compiled file for at least one SDK of the to-be-fixed project.

It can be seen that in an embodiment of the present disclosure, it is determined, for each of the to-be-fixed methods, whether the to-be-fixed method exists in two or more SDKs. If a to-be-fixed method exists in two or more SDKs, a stub for the to-be-fixed method is only retained in a compiled file for one SDK, so as to remove duplicate to-be-fixed methods in the to-be-fixed project, and prevent the hotfix patch from fixing wrong to-be-fixed methods. Therefore, in an embodiment of the present disclosure, in the case that hotfix is performed on multiple accessible SDKs dependent from each other, conflicts between hotfix patches for the SDKs can be avoided.

Figure 2:
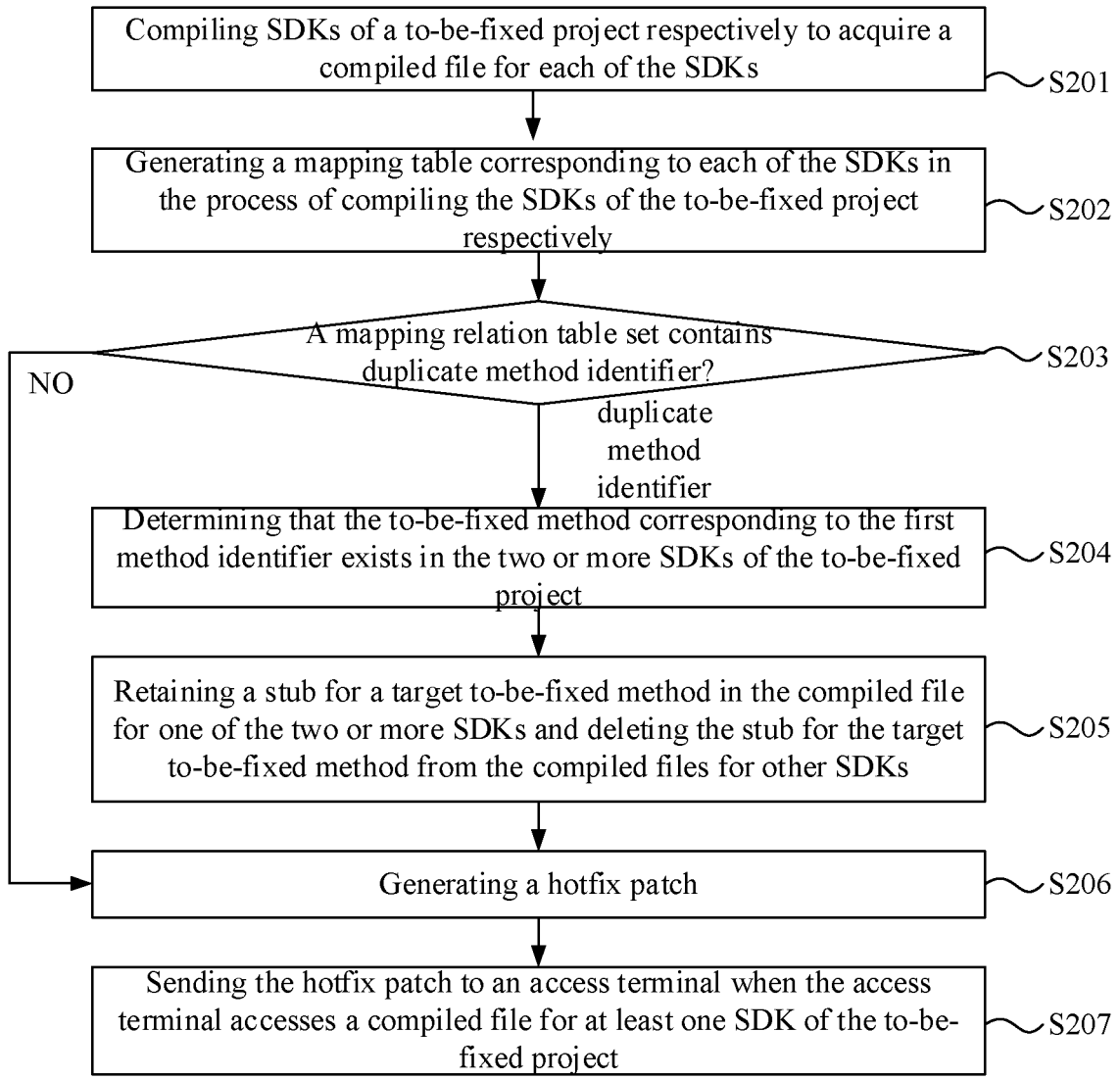
FIG. 2 is a second flow chart of a hotfix method according to an embodiment of the present disclosure.

In a possible implementation of an embodiment of the present disclosure, referring to FIG. 2, a hotfix method according to another embodiment of the present disclosure includes S201 to S207.

In S201, SDKs of a to-be-fixed project are compiled to acquire a compiled file for each of the SDKs.

The to-be-fixed project includes at least two SDKs with dependency relationship, and the compiled file for each of the SDKs includes stubs for to-be-fixed methods in the corresponding SDK.

It should be noted that reference for the relevant contents of S201 may be made to S101.

In S202, a mapping table is generated for each of the SDKs in the process of compiling the SDKs of the to-be-fixed project respectively.

The mapping table corresponding to each of the SDKs records correspondence between the to-be-fixed methods and method identifiers in the corresponding SDK.

That is, a mapping table corresponding to a SDK records the correspondence between the to-be-fixed methods and method identifiers in the SDK. For example, a mapping table corresponding to SDK2 records the correspondence between the to-be-fixed methods and method identifiers in SDK2.

In a possible embodiment, the implementation of S202 may include the following steps a to c.

In step a, in the process of compiling the SDKs of the to-be-fixed project respectively, a method signature of each of the to-be-fixed methods in the SDKs is acquired.

Specifically, in the process of compiling any SDK in the to-be-fixed project, all classes in the SDK may be acquired, then all methods of each class are acquired, then to-be-fixed methods are determined from all methods of each class, and finally a method signature of each to-be-fixed method is extracted.

In step b, the method signature of each of the to-be-fixed methods of the SDKs is encrypted based on a preset encryption algorithm, to acquire an encryption value corresponding to each of the to-be-fixed methods.

In a possible embodiment, the preset encryption algorithm is Message-Digest Algorithm (MD5). The encrypting the method signature of each of the to-be-fixed methods in the SDKs based on the preset encryption algorithm to acquire the encryption value corresponding to each of the to-be-fixed methods includes: encrypting the method signature of each of the to-be-fixed methods in the SDKs based on a MD5 to acquire a MD5 value of the method signature.

On the basis of the above embodiments, the preset encryption algorithm in an embodiment of the present disclosure may be other encryption algorithms, for example, RSA encryption algorithm, DES encryption algorithm, etc.

In step c, for each SDK, a correspondence is established between the to-be-fixed methods in the SDK and the corresponding encryption values, so that a mapping table is generated for each of the SDKs.

That is, the encryption value corresponding to any to-be-fixed method is an encryption value obtained by encrypting the method signature of the to-be-fixed method based on the preset encryption algorithm. In the case that the preset encryption algorithm is MD5, the encryption value corresponding to any to-be-fixed method is a MD5 value of the to-be-fixed method.

In S203, it is determined whether a mapping relation table set contains a duplicate method identifier.

The mapping relation table set is a set of the mapping tables corresponding to the SDKs of the to-be-fixed project.

As described above, there must not be duplicate method and duplicate to-be-fixed method in the same SDK, but there may be same methods and same to-be-fixed methods in multiple SDKs, and the same methods have the same method signature and the same method identifier. Therefore, the mapping relationship table set may include a duplicate method identifier.

In S203, if each method identifier only appears in one correspondence relationship, it is determined that the mapping relationship table set contains no duplicate method identifier, and the following S206 to S207 are performed. If a target method identifier appears in two or more correspondence relationships, it is determined that the target method identifier is a duplicate method identifier, and the following S204 to S207 are performed.

In S204, it is determined that the to-be-fixed method corresponding to the target identifier exists in two or more SDKs of the to-be-fixed project.

In S205, a stub for a to-be-fixed method corresponding to the target identifier is retained in a compiled file for one of the two or more SDKs, and the stub for the to-be-fixed method corresponding to the target identifier is deleted from compiled files for other SDKs.

It should be noted that the embodiment of S205 is similar to that of S103 above.

In S206, a hotfix patch is generated.

The hotfix patch includes a patch corresponding to a stub for each of the to-be-fixed methods.

It should be noted that reference for the relevant contents of S206 may be made to S104 above.

In S207, the hotfix patch is sent to an access terminal when the access terminal accesses a compiled file for at least one SDK of the to-be-fixed project.

The hotfix method according to this embodiment is a refinement of the hotfix method shown in FIG. 1, and its technical effect is similar to that of the hotfix method shown in FIG. 1, which is not repeated here.

Figure 3:
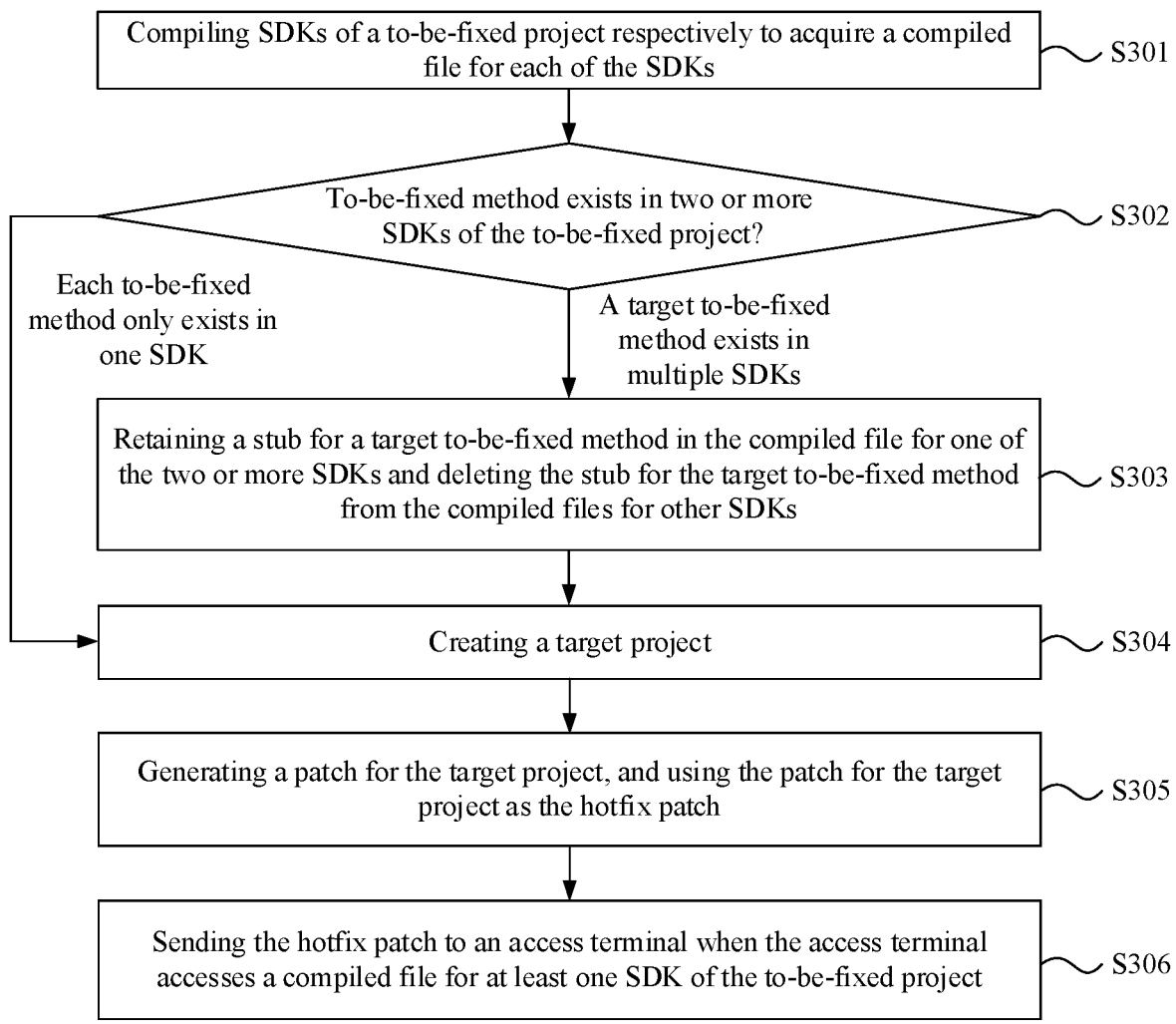
FIG. 3 is a third flow chart of a hotfix method according to an embodiment of the present disclosure.

In a possible implementation of an embodiment of the present disclosure, referring to FIG. 3, the hotfix method according to another embodiment of the present disclosure includes S301 to S306.

In S301, SDKs of the to-be-fixed project are compiled to acquire a compiled file for each of the SDKs.

The to-be-fixed project includes at least two SDKs with dependency relationship, and the compiled file for each of the SDKs includes stubs for to-be-fixed methods in the SDK.

It should be noted that reference for the relevant contents of S301 may be made to S101 above.

In S302, it is determined, for each of the to-be-fixed methods, whether the to-be-fixed method exists in two or more SDKs of the to-be-fixed project.

In S302, if a target to-be-fixed method exists in two or more SDKs of the to-be-fixed project, the following S303 to S306 are performed. If each of the to-be-fixed methods only exists in one SDK of the to-be-fixed project, the following S304 to S306 are performed.

In S303, a stub for a target to-be-fixed method is retained in a compiled file for one of the two or more SDKs, and the stub for the target to-be-fixed method is deleted from compiled files for other SDKs.

In S304, a target project is created.

The target project depends on the compiled file for each of the SDKs of the to-be-fixed project.

That is, all SDKs of the to-be-fixed project are regarded as one to create an external project that depends on all SDKs in the to-be-fixed project.

In S305, a patch for the target project is generated and used as the hotfix patch.

In a possible embodiment, the implementation of the above S305 may include the following steps I to III:

In step I: a code set is acquired.

The code set includes codes of the compiled file corresponding to each of the SDKs of the to-be-fixed project.

In step II: to-be-fixed codes are read from the code set.

The to-be-fixed codes correspond to to-be-fixed methods in each of the SDKs.

Specifically, a to-be-fixed method of each SDK may be marked with annotations, and then the to-be-fixed codes are found based on the annotations.

In step III: the patch for the target project is generated based on the to-be-fixed codes.

In S306, the hotfix patch is sent to an access terminal when the access terminal accesses a compiled file for at least one SDK of the to-be-fixed project.

In this embodiment, an external project that depends on the compiled files for the SDKs of the to-be-fixed project is created, a patch for the external project is generated, and the patch for the target project is used as the hotfix patch. Therefore, in this embodiment, patches of all to-be-fixed methods of the to-be-fixed project may be managed as a whole, without separately managing the patch of each of the to-be-fixed methods. Therefore, the management of the hotfix patch may be further simplified according to this embodiment.

In addition, in an embodiment of the present disclosure, the hotfix patch including patches corresponding to all the stubs is sent to the access terminal. Even if the access terminal does not access a compiled file for a certain SDK of the to-be-fixed project, it will not affect the patch of the compiled file for the accessed SDK to take effect, but only the patch for the compiled file that is not accessed will not take effect.

In a possible implementation of an embodiment of the present disclosure, on the basis of the hotfix method according to any of the above embodiments, the hotfix method according to an embodiment of the present disclosure further includes:

adding, for each of the to-be-fixed methods, a method identifier of the to-be-fixed method to the stub for the to-be-fixed method in the process of generating the stub for the to-be-fixed method;

adding, for each of the to-be-fixed methods, the method identifier of the to-be-fixed method to the patch corresponding to the stub for the to-be-fixed method in the process of generating the hotfix patch;

determining whether a method identifier in each stub is the same as a method identifier in a called patch;

confirming that the hotfix patch is wrong in a case that the method identifier in one or more stubs is different from the method identifier in the called patch; and confirming that the hotfix patch is correct in a case that the method identifier in each stub is the same as the method identifier in the called patch.

In the above embodiment, the corresponding method identifier is added to the stub when generating the stub for a to-be-fixed method. The corresponding method identifier is added to a patch for the to-be-fixed method when the patch is generated. Before the patch takes effect, it is verified whether the method identifier in the stub is the same as the method identifier in the patch, so as to verify whether the generated hotfix patch is correct. Therefore, it may be ensured that the correct hot fix patch takes effect.

In addition, since the corresponding method identifier is added to the stub when stub is generated for the to-be-fixed method, and it is verified whether the method identifier in the stub is the same as the method identifier in the patch before the patch takes effect, a forged patch may be prevented from taking effect and thus the security of a software product is improved with the method according to the above embodiment.

Based on the same inventive concept, in the implementation of the above method, a hotfix apparatus is provided according to an embodiment of the present disclosure. The apparatus embodiment corresponds to the above method embodiment. To facilitate reading, details of the above method embodiment is not repeated in the apparatus embodiment. However, it should be clear that the hotfix apparatus in the embodiment can implement all the contents of the above method embodiment.

Figure 4:
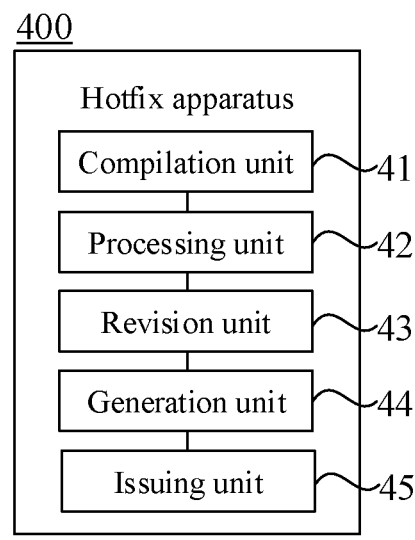
FIG. 4 is a first schematic structural diagram of a hotfix apparatus according to an embodiment of the present disclosure.

FIG. 4 is a schematic structural diagram of a hotfix apparatus according to an embodiment of the present disclosure. As shown in FIG. 4, a hotfix apparatus 400 according to the embodiment includes a compilation unit 41, a processing unit 42, a revision unit 43, a generating unit 44, and an issuing unit 45.

The compilation unit 41 is configured to compile SDKs of the to-be-fixed project to acquire a compiled file for each of the SDKs. The to-be-fixed project includes at least two SDKs with dependency relationship, and the compiled file for each of the SDK includes stubs for to-be-fixed method of a corresponding SDK.

The processing unit 42 is configured to determine, for each of the to-be-fixed methods, whether the to-be-fixed method exists in two or more SDKs of the to-be-fixed project.

The revision unit 43 is configured to, if a target to-be-fixed method exists in the two or more SDKs, retain a stub for the target to-be-fixed method in the compiled file for one of the two or more SDKs and delete the stub for the target to-be-fixed method from the compiled files for other SDKs.

The generation unit 44 is configured to generate a hotfix patch. The hotfix patch includes a patch corresponding to a stub for each of the to-be-fixed methods.

The issuing unit 45 is configured to send the hotfix patch to an access terminal when the access terminal accesses a compiled file for at least one SDK of the to-be-fixed project.

In a possible implementation of an embodiment of the present disclosure,

The compilation unit 41 is further configured to generate a mapping table for each of the SDKs in the process of compiling the SDKs of the to-be-fixed project respectively. The mapping table corresponding to each of the SDKs records correspondence between the to-be-fixed methods and method identifiers of the corresponding SDK.

The processing unit 42 is configured to: determine whether a mapping relation table set contains a duplicate method identifier; and if a target method identifier is the duplicate method identifier, determine that the to-be-fixed method corresponding to the target method identifier exists in two or more SDKs of the to-be-fixed project.

The mapping relation table set is a set of the mapping tables corresponding to the SDKs of the to-be-fixed project.

In a possible implementation of an embodiment of the present disclosure, the compilation unit 41 is further configured to acquire a method signature of each of the to-be-fixed methods in the SDKs in the process of compiling the SDKs of the to-be-fixed project respectively; encrypt the method signature of each of the to-be-fixed methods in the SDKs based on a preset encryption algorithm to acquire a corresponding encryption value of each of the to-be-fixed methods; and establish correspondence between the to-be-fixed methods in the SDKs and the corresponding encryption values, to generate the mapping table for each of the SDKs.

In a possible implementation of an embodiment of the present disclosure, the compilation unit 41 is further configured to encrypt the method signature of each of the to-be-fixed methods in the SDKs based on a MD5 to acquire a MD5 value of the method signature.

Figure 5:
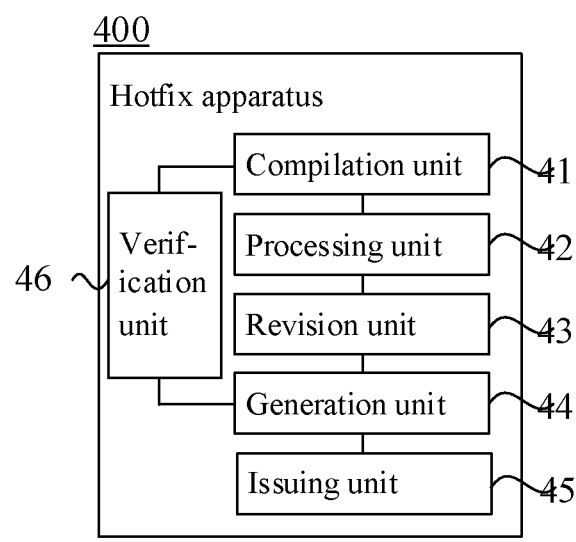
FIG. 5 is a second schematic structural diagram of a hotfix apparatus according to an embodiment of the present disclosure.

In a possible implementation of an embodiment of the present disclosure, referring to FIG. 5, the hotfix apparatus 400 further includes a verification unit 46.

The compilation unit 41 is further configured to add, for each of the to-be-fixed methods, a method identifier of the to-be-fixed method to the stub for the to-be-fixed method in the process of generating the stub for the to-be-fixed method.

The generation unit 44 is further configured to add, for each of the to-be-fixed methods, the method identifier of the to-be-fixed method to the patch corresponding to the stub for the to-be-fixed method in the process of generating the hotfix patch.

The verification unit 46 is configured to: determine whether a method identifier in each stub is the same as a method identifier in the called patch; confirm that the hotfix patch is wrong in a case that the method identifier in one or more stubs is different from the method identifier in the called patch; and confirm that the hotfix patch is correct in a case that the method identifier in each stub is the same as the method identifier in the called patch.

In a possible implementation of an embodiment of the present disclosure, the generation unit 44 is further configured to: create a target project, where the target project depends on the compiled file for each of the SDKs of the to-be-fixed project; and generate a patch for the target project, and take the patch for the target project as the hotfix patch.

In a possible implementation of an embodiment of the present disclosure, the generation unit 44 is further configured to acquire a code set, read to-be-fixed codes in the code set, and generate a patch for the target project based on the to-be-fixed codes.

The code set includes codes of the compiled file corresponding to each of the SDKs of the to-be-fixed project. The to-be-fixed codes correspond to the to-be-fixed methods in each of the SDKs.

Figure 6:
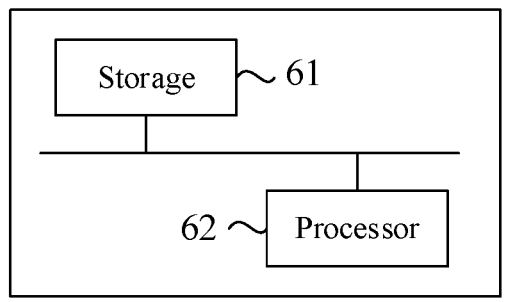
FIG. 6 is a schematic hardware structural diagram of an electronic device according to an embodiment of the present disclosure.

Based on the same inventive concept, an electronic device is further provided according to an embodiment of the present disclosure. FIG. 6 is a schematic structural diagram of an electronic device according to an embodiment of the present disclosure. As shown in FIG. 6, the electronic device according to the embodiment includes: a memory 61 and a processor 62. The memory 61 is configured to store a computer programs. The processor 62 is configured to, when calling the computer program, perform steps of the hotfix method according to the above embodiments.

A computer-readable storage medium storing a computer program is further provided according to an embodiment of the present disclosure. The computer program, when executed by a processor, implements the steps of the hotfix method according to the above embodiments.

Those skilled in the art should understand that the embodiments of the present disclosure may be provided as a method, a system or a computer program product. Therefore, the present disclosure may adopt the form of a complete hardware embodiment, a complete software embodiment, or an embodiment combining hardware and software. Furthermore, the present disclosure may take the form of a computer program product implemented on one or more computer usable storage media containing computer usable program codes.

The processors may be a central processing unit (CPU), a general-purpose processor, a digital signal processors (DSP), an application specific integrated circuit (ASIC), a field-programmable gate array (FPGA), any other programmable logic device, a discrete gate, a transistor logic device, a discrete hardware component and the like. The general-purpose processor may be a microprocessor or any regular processor.

The memory may include non-permanent memory, random access memory (RAM), and/or non-volatile memory in the computer-readable medium, such as read-only memory (ROM) or flash RAM. The memory is an example of the computer-readable medium.

Computer-readable media include permanent and non-permanent, removable and non-removable storage media. The storage medium may realize information storage by any method or technology, and the information may be computer-readable instructions, data structures, modules of programs, or other data. The computer readable storage medium includes but is not limited to a phase change random access memory (PRAM), a static random access memory (SRAM), a dynamic random access memory (DRAM), other types of random access memory (RAM), a read only memory (ROM), an electrically erasable programmable read-only memory (EEPROM), a flash memory or other memories, a compact disk read only memory (CD-ROM), a digital video disk (DVD) or other optical memories, a cassette magnetic tape, a disk memory, other magnetic storage devices, any other non-transmission medium or any devices capable of storing information that can be accessed by a computer device. The computer readable storage medium in the present disclosure does not include a computer readable transitory medium such as a modulated data signal and carrier.

Finally, it should be noted that the above embodiments are only intended to illustrate the technical solutions of the present disclosure, but not to limit the scope of the present disclosure. Although the present disclosure is described in detail with reference to the above embodiments, it should be understood by those skilled in the art that modifications can be made to the technical solutions according to the above embodiments or equivalent replacements can be made to some or all of the technical features thereof. The modifications and equivalent replacements will not make the corresponding technical solutions deviate from the scope of the technical solutions of the embodiments of the present disclosure.

The invention claimed is:

1. A hotfix method, comprising:
    compiling Software Development Kits (SDKs) of a to-be-fixed project respectively to acquire a compiled file for each of the SDKs, wherein the to-be-fixed project comprises at least two SDKs with dependency relationship, and the compiled file for each of the SDKs comprises stubs for to-be-fixed methods in the corresponding SDK;
    acquiring a method signature of each of the to-be-fixed methods in the SDKs, in a process of compiling the SDKs of the to-be-fixed project respectively;
    encrypting the method signature of each of the to-be-fixed methods in the SDKs based on a preset encryption algorithm, to acquire a corresponding encryption value of each of the to-be-fixed methods;
    determining, for each of the to-be-fixed methods, whether the to-be-fixed method exists in two or more SDKs of the to-be-fixed project;
    in response to a target to-be-fixed method existing in the two or more SDKs, retaining a stub for the target to-be-fixed method in the compiled file for one of the two or more SDKs and deleting the stub for the target to-be-fixed method from the compiled files for other SDKs;
    generating a hotfix patch, wherein the hotfix patch comprises a patch corresponding to the stub for each of the to-be-fixed methods; and
    sending the hotfix patch to an access terminal in a case that the access terminal accesses the compiled file for at least one SDK of the to-be-fixed project.

2. The method according to claim 1, wherein the method further comprises:
    generating a mapping table for each of the SDKs in the process of compiling the SDKs of the to-be-fixed project respectively, wherein the mapping table corresponding to each of the SDKs records correspondence between the to-be-fixed methods and method identifiers in the corresponding SDK; and
    wherein the determining, for each of the to-be-fixed methods, whether the to-be-fixed method exists in two or more SDKs of the to-be-fixed project comprises:
        determining whether a mapping relation table set contains a duplicate method identifier, wherein the mapping relation table set is a set of the mapping tables corresponding to the SDKs of the to-be-fixed project; and
        in response to a target method identifier being the duplicate method identifier, determining that the to-be-fixed method corresponding to the target method identifier exists in the two or more SDKs of the to-be-fixed project.

3. The method according to claim 2, wherein the generating a mapping table corresponding to each of the SDKs in the process of compiling the SDKs of the to-be-fixed project respectively comprises:
    establishing correspondence between the to-be-fixed methods in the SDKs and the corresponding encryption values, to generate the mapping table for each of the SDKs.

4. The method according to claim 3, wherein the encrypting the method signature of each of the to-be-fixed methods in the SDKs based on a preset encryption algorithm to acquire a corresponding encryption value of each of the to-be-fixed methods comprises:
    encrypting the method signature of each of the to-be-fixed methods in the SDKs based on a message digest algorithm MD5 to acquire a MD5 value of the method signature.

5. The method according to claim 1, further comprising:
    adding, for each of the to-be-fixed methods, a method identifier of the to-be-fixed method to the stub for the to-be-fixed method in the process of generating the stub for the to-be-fixed method;
    adding, for each of the to-be-fixed methods, the method identifier of the to-be-fixed method to the patch corresponding to the stub for the to-be-fixed method in the process of generating the hotfix patch;
    determining whether a method identifier in each stub is the same as a method identifier in a called patch;
    confirming that the hotfix patch is wrong in a case that the method identifier in one or more stubs is different from the method identifier in the called patch; and
    confirming that the hotfix patch is correct in a case that the method identifier in each stub is the same as the method identifier in the called patch.

6. The method according to claim 1, wherein the generating a hot fix patch comprises:
    creating a target project, wherein the target project depends on the compiled file for each of the SDKs of the to-be-fixed project; and
    generating a patch for the target project, and taking the patch for the target project as the hotfix patch.

7. The method according to claim 6, wherein the generating a patch for the target project comprising:

acquiring a code set, wherein the code set comprises codes of the compiled file corresponding to each of the SDKs of the to-be-fixed project;

reading to-be-fixed codes in the code set, wherein the to-be-fixed codes correspond to to-be-fixed methods in each of SDKs; and generating the patch for the target project based on the to-be-fixed codes.

8. An electronic device comprising: a memory and a processor, wherein the memory is configured to store a computer program, and the processor is configured to, when calling the computer program, perform:

compiling Software Development Kits (SDKs) of a to-be-fixed project respectively to acquire a compiled file for each of the SDKs, wherein the to-be-fixed project comprises at least two SDKs with dependency relationship, and the compiled file for each of the SDKs comprises stubs for to-be-fixed methods in the corresponding SDK;

acquiring a method signature of each of the to-be-fixed methods in the SDKs, in a process of compiling the SDKs of the to-be-fixed project respectively:

encrypting the method signature of each of the to-be-fixed methods in the SDKs based on a preset encryption algorithm, to acquire a corresponding encryption value of each of the to-be-fixed methods;

determining, for each of the to-be-fixed methods, whether the to-be-fixed method exists in two or more SDKs of the to-be-fixed project;

in response to a target to-be-fixed method existing in the two or more SDKs, retaining a stub for the target to-be-fixed method in the compiled file for one of the two or more SDKs and deleting the stub for the target to-be-fixed method from the compiled files for other SDKs;

generating a hotfix patch, wherein the hotfix patch comprises a patch corresponding to the stub for each of the to-be-fixed methods; and sending the hotfix patch to an access terminal in a case that the access terminal accesses the compiled file for at least one SDK of the to-be-fixed project.

9. The electronic device according to claim 8, wherein the processor is further configured to, when calling the computer program, perform:

generating a mapping table for each of the SDKs in the process of compiling the SDKs of the to-be-fixed project respectively, wherein the mapping table corresponding to each of the SDKs records correspondence between the to-be-fixed methods and method identifiers in the corresponding SDK;

determining whether a mapping relation table set contains a duplicate method identifier, wherein the mapping relation table set is a set of the mapping tables corresponding to the SDKs of the to-be-fixed project; and in response to a target method identifier being the duplicate method identifier, determining that the to-be-fixed method corresponding to the target method identifier exists in the two or more SDKs of the to-be-fixed project.

10. The electronic device according to claim 9, wherein the processor is further configured to, when calling the computer program, perform:

establishing correspondence between the to-be-fixed methods in the SDKs and the corresponding encryption values, to generate the mapping table for each of the SDKs.

11. The electronic device according to claim 10, wherein the processor is further configured to, when calling the computer program, perform:

encrypting the method signature of each of the to-be-fixed methods in the SDKs based on a message digest algorithm MD5 to acquire a MD5 value of the method signature.

12. The electronic device according to claim 8, wherein the processor is further configured to, when calling the computer program, perform:

adding, for each of the to-be-fixed methods, a method identifier of the to-be-fixed method to the stub for the to-be-fixed method in the process of generating the stub for the to-be-fixed method;

adding, for each of the to-be-fixed methods, the method identifier of the to-be-fixed method to the patch corresponding to the stub for the to-be-fixed method in the process of generating the hotfix patch;

determining whether a method identifier in each stub is the same as a method identifier in a called patch;

confirming that the hotfix patch is wrong in a case that the method identifier in one or more stubs is different from the method identifier in the called patch; and confirming that the hotfix patch is correct in a case that the method identifier in each stub is the same as the method identifier in the called patch.

13. The electronic device according to claim 8, wherein the processor is further configured to, when calling the computer program, perform:

creating a target project, wherein the target project depends on the compiled file for each of the SDKs of the to-be-fixed project; and generating a patch for the target project, and taking the patch for the target project as the hotfix patch.

14. The electronic device according to claim 13, wherein the processor is further configured to, when calling the computer program, perform:

acquiring a code set, wherein the code set comprises codes of the compiled file corresponding to each of the SDKs of the to-be-fixed project;

reading to-be-fixed codes in the code set, wherein the to-be-fixed codes correspond to to-be-fixed methods in each of SDKs; and generating the patch for the target project based on the to-be-fixed codes.

15. A non-transitory computer readable storage medium having a computer program stored thereon, wherein the computer program, when executed by a processor, implements:

compiling Software Development Kits (SDKs) of a to-be-fixed project respectively to acquire a compiled file for each of the SDKs, wherein the to-be-fixed project comprises at least two SDKs with dependency relationship, and the compiled file for each of the SDKs comprises stubs for to-be-fixed methods in the corresponding SDK;

acquiring a method signature of each of the to-be-fixed methods in the SDKs, in a process of compiling the SDKs of the to-be-fixed project respectively;

encrypting the method signature of each of the to-be-fixed methods in the SDKs based on a preset encryption algorithm, to acquire a corresponding encryption value of each of the to-be-fixed methods;

determining, for each of the to-be-fixed methods, whether the to-be-fixed method exists in two or more SDKs of the to-be-fixed project;

in response to a target to-be-fixed method existing in the two or more SDKs, retaining a stub for the target to-be-fixed method in the compiled file for one of the two or more SDKs and deleting the stub for the target to-be-fixed method from the compiled files for other SDKs;

generating a hotfix patch, wherein the hotfix patch comprises a patch corresponding to the stub for each of the to-be-fixed methods; and sending the hotfix patch to an access terminal in a case that the access terminal accesses the compiled file for at least one SDK of the to-be-fixed project.

* * * * *